Patented Feb. 1, 1944

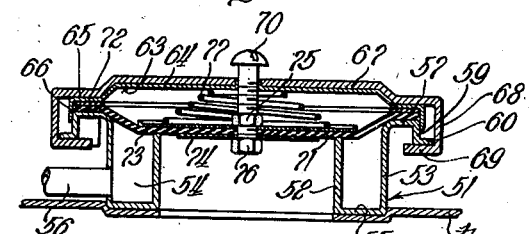
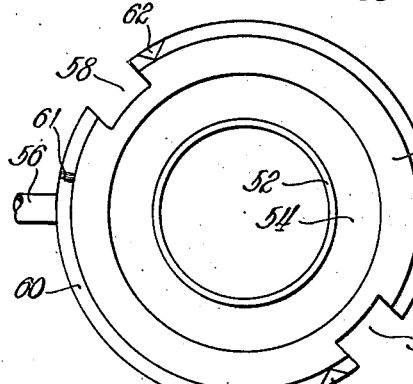
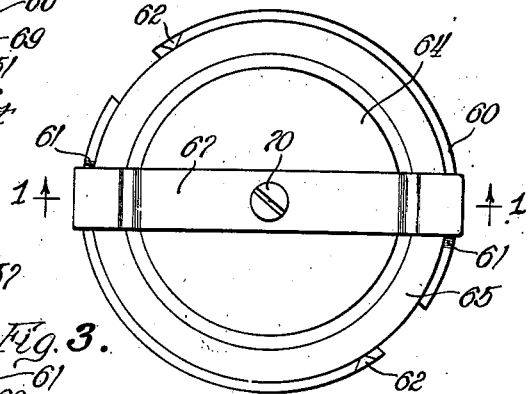
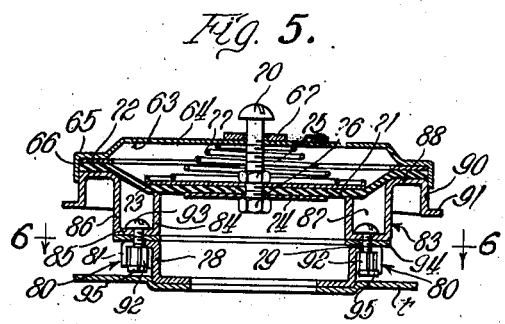
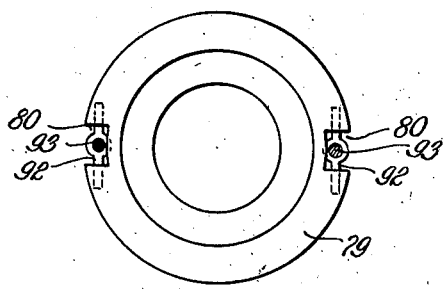
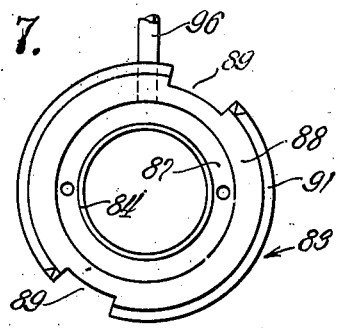

2,340,593

UNITED STATES PATENT OFFICE 2,340,593

FILLER NECK AND CAP

Frank P. Illsley, Muskegon, Mich.

Application April 25, 1940, Serial No. 331,607

3 Claims. (Cl. 220—44)

This invention relates to cooling systems for internal combustion engines, and has to do with a filler neck and cap structure for use with an automobile radiator.

In automobile cooling systems, particularly systems normally closed to the atmosphere, considerable pressure may be built up within the system and, unless relieved, might cause bursting of the radiator or other damage. The instant invention is directed to the provision of a radiator filler neck and a cap therefor of such character as to relieve the pressure in the radiator, when it attains a predetermined maximum value, while also serving as a warning and obstructing further opening of the cap, upon partial removal of the latter, in the event the pressure in the radiator is below the predetermined maximum but sufficiently high to incur the risk of scalding if the cap be removed, partial removal of the cap serving to vent the radiator and to lower the pressure therein sufficiently to permit the cap to be completely removed with safety. Further objects and advantages of my invention will appear from the detailed description.

In the drawing:

Figure 1 is a sectional view taken substantially on line 1—1 of Figure 2, with certain parts shown in elevation, of a filler neck and cap structure embodying my invention;

Figure 2 is a plan view of the cap structure shown in Figure 1;

Figure 3 is a plan view of the filler neck structure shown in Figure 1;

Figure 4 is a side view of the filler neck structure of Figure 3;

Figure 5 is a sectional view similar to Figure 1, showing a modified form of my invention comprising an adapter for mounting the cap structure on a filler neck of known type;

Figure 6 is a sectional view taken substantially on line 6—6 of Figure 5; and

Figure 7 is a plan view of the adapter shown in Figure 5.

In Figure 1, the filler neck structure 51 comprises an inner wall 52 which defines the filler neck proper, and an outer wall 53 concentric with wall 52 and defining therewith an annular venting passage 54 closed at its lower end by a bight element 55 connecting the lower edges of walls 52 and 53. Bight element 55 seats in a depression in the top wall of upper tank t of an automobile radiator of known construction, indicated fragmentarily by wall t, in which it may be soldered or otherwise secured. A vent tube 56 opens through wall 53 into passage 54. The neck structure thus provided comprises a filler neck and a venting passage exterior thereto.

Wall 53 is provided, at its upper end, with an outwardly extending circumferential flange 57 in which are cut two diametrically opposite notches 58, and the portions of flange 57 at opposite sides of these notches are each provided with a depending flange 59 which tapers in height in one direction and is provided, at its lower edge, with an outwardly extending flange 60 providing a cam element. These two cam elements thus provided are oppositely related for securing a closure cap structure on the upper end of the neck structure, as will appear presently. Flange 59 is provided, adjacent its ends, with depressed elements providing stops 61 and 62. Each of the cam members, comprising flanges 59 and 60 are of similar construction, as will be understood.

The cap structure for closing the upper or outer end of the neck structure comprises a housing 63, conveniently formed of sheet metal, having a body portion 64 provided with a circumferential flange 65 from which depends a circumferential flange 66. A securing bar 67, conveniently formed of steel and possessing appreciable resiliency, extends diametrically of the top wall of housing 64, is shaped conformably thereto and is provided, at each end, with a substantially U-shaped element 68 providing a finger 69 disposed to engage beneath the flange 60 of one of the cam members. A headed screw 70 extends loosely through top wall 64 of housing 63, downward movement of this screw being limited by contact of the head thereof with bar 67, through which the screw also extends for pivoting this bar to the cap structure. An elastic diaphragm 71, formed of rubber composition or other suitable material, extends across the bottom or lower end of the body portion of housing 63, the outer peripheral portion of this diaphragm extending beneath flange 65, there being a gasket 72 confined between this flange and the outer peripheral portion of diaphragm 71 which extends to, or substantially to, the depending flange 66. A substantially rigid disc 73, conveniently formed of metal and preferably cupped, seats on the upper face of diaphragm 72 concentric therewith, and a second rigid disc 74, conveniently formed of metal, seats against the underface of diaphragm 71 concentrically with disc 73. The latter disc preferably is of somewhat greater diameter than neck 52, as shown, disc 74 being of less diameter than the interior of neck 52. Screw 70 passes through discs 73 and 74 and the diaphragm 71, these parts being clamped together by nuts 75 and 76 threaded onto the screw 70. A spiral compression spring 77 is confined between top wall 64 of the cap housing and disc 73. This spring yieldingly urges downward the portion of diaphragm 71 underlying disc 73, as will be obvious, such downward movement of the diaphragm being limited by contact of the head of screw 70 with the bar 67.

Wall 52, defining the filler neck proper, may be somewhat shorter than wall 53, as will be clear from Figure 1. In applying the cap structure to the neck structure, fingers 69 are inserted downward through the notches 58 and the bar 67, which is of considerably greater thickness than the top wall 64 of the cap structure, is turned in a clockwise direction, as viewed in Figure 3, thus forcing the cap structure downward onto the neck structure, it being noted that the portions of bar 67 adjacent element 68 thereof seat upon the upper face of flange 65. The diaphragm 71 seats upon the upper end of wall 52, adjacent the circumference of disc 73, and the outer peripheral portion of diaphragm 71 seats upon flange 57 at the top of wall 53, and is clamped tightly between flange 57 and gasket 72, through the medium of flange 65 and the overlying contacting portion of bar 67. In that manner a fluid tight and pressure resistant seal is provided between the cap structure and the neck structure at the upper or outer end of wall 53. When the cap structure is thus secured upon the neck structure, the head of screw 70 is spaced a short distance above the bar 67, slightly less than the maximum height of the respective flanges 59 of the cam elements. When the cap structure is first placed upon the neck structure, diaphragm 71 seats upon the upper or outer end of filler neck 52 and, as the cap structure is brought downward due to turning of bar 67 into its full securing position, spring 77 is placed under increasing compression, such downward movement of the cap structure serving to space the head of screw 70 above the securing bar in the manner above noted. Thereafter diaphragm 71 is held seated upon the upper end of neck 52 by spring 77, and normally closes the upper end of the neck so as to prevent escape therethrough of vapors or fluids to the venting passage 54.

The spring 77 permits upward displacement of the diaphragm responsive to predetermined maximum pressure within the radiator and the filler neck 52. When that pressure is attained, the diaphragm is raised from the neck, in opposition to spring 77, thus venting the radiator and neck 52 to the passage 54, from which the steam or vapor escapes through the tube 56. When that occurs, however, the seal between the cap structure and flange 57 at the top of wall 53 is not disturbed and, therefore, is maintained. In that manner I assure that the radiator will be vented when the predetermined maximum pressure is attained therein while, so long as the cap structure is secured in full closed position, maintaining a fluid-tight and pressure resistant closure between the cap structure and outer wall 53 of the neck structure. If it is attempted to remove the cap structure when there is appreciable pressure within the radiator, below the predetermined maximum pressure, warning of the presence of such pressure will be given, and complete removal of the cap structure will be obstructed.

It is desirable that means be provided whereby the filler neck cap structure of Figure 1 may readily be applied to filler necks of known type. In Figure 5, I have shown a filler neck 78 provided, at its upper or outer end with a circumferential flange 79 having cuts wherein two diametrically opposite notches or openings 80, each portion of flange 79 thus provided having a depending flange 81 of decreasing height in one direction, the latter flanges being oppositely directed and the lower edges thereof providing cam surfaces in a known manner. An adapter 83 is mounted upon the upper or outer end of filler neck 78, in a manner which will now be described.

The adapter 83 is similar in construction to the neck structure 51 of Fig. 1. It comprises an inner wall 84 connected, at its lower end, by a bight element 85, to a concentric outer wall 86 defining with wall 84 an annular venting passage 87. Wall 83 is provided, at its upper end, with an outwardly extending circumferential flange 88 provided with two diametrically opposite cut-outs or notches 89. Each of the portions of flange 88 between the notches 89 is provided, at its outer edge, with a depending flange 90 which decreases in height toward one end, flange 90 being provided, at its lower edge, with an outwardly extending flange 91 providing a cam surface. Two anchor members 92 bridge the openings 90 in flange 79 of neck 78 with end portions extending beneath flange 79. Headed screws 93 pass through bight element 85 of adapter 83, through a gasket 94 interposed between bight element 85 and flange 79, and thence downward through the anchor members 92, nuts 95 being threaded upon the lower end portions of these screws and cooperating with the members 92 for clamping the adapter tightly on the upper end of the filler neck 78 so as to provide, with the gasket 94, a fluid-tight and pressure resistant closure between the adapter and the upper or outer end of the filler neck. The cap structure is the same as in Figure 1 and is secured upon the upper or outer end of the adapter in the same manner as the cap structure of Figure 1 is secured upon the neck structure of that figure. The adapter 83 is provided with a vent tube 96 which opens into the venting passage 87. When the adapter is secured upon the filler neck 78 in the manner stated, and the cap structure is secured upon the upper or outer end of the adapter, the adapter and the cap structure cooperate in the same manner as the cap structure and the filler neck structure of Figure 6, and further description thereof is unnecessary.

Within the broader aspects of my invention, the adapter may be secured in position on the filler neck 78 in any suitable manner. Also, while I have shown the cap structure as provided with an elastic diaphragm 71 and spring means for urging the diaphragm toward the neck structure, that specific structure is not essential to the broader aspects of my invention which comprehends the use of any suitable diaphragm or equivalent means. If desired, a resilient metal diaphragm may be utilized in place of the diaphragm 71 of Figure 1, in which case the compression spring 77 could, if desired, be omitted, the inherent resiliency of the diaphragm being relied upon normally to maintain the closure between the valve element of the diaphragm and the upper or outer end of the filler neck or wall 52 or 84, as the case may be.

As above indicated, and as will be understood by those skilled in the art, various changes in construction and arrangement of parts of my invention may be resorted to without departing from the field and scope of the same, and I intend to include all such variations, as fall within the scope of the appended claims, in this application, in which the preferred forms only of my invention are disclosed.

I claim:

1. In combination, an automobile radiator, a filler neck structure therefor comprising an inner wall defining a filler neck and an outer wall defining with said neck an exterior venting passage, a cap structure for closing the outer end of said neck structure comprising a housing having a circumferential portion overlying said outer wall, means for removably securing said cap structure on said outer wall, and an elastic disc extending across the lower end of said housing and beneath the circumferential portion thereof yieldingly urged toward said neck, the peripheral portion of said disc being clamped between said circumferential portion of said cap structure housing and the outer end of said outer wall and the portion of said disc inward beyond said circumferential portion of said cap structure housing normally yieldingly seating on the outer end of said neck, when said cap is in substantially fully closed position.

2. In combination, an automobile radiator, a filler neck structure therefor comprising an inner wall defining a filler neck and an outer wall defining with said neck an exterior venting passage, a cap structure for closing the outer end of said neck structure comprising a housing, means for removably securing said cap structure on said outer wall, said housing having a circumferential portion overlying the outer end of said outer wall, an elastic disc extending across the lower end of said housing and beneath said circumferential portion thereof, a substantially rigid disc at the outer face of said elastic disc approximately equal in diameter to said neck, a compression spring confined between said rigid disc and the top of said housing, and means for removably securing said cap structure on said outer wall with said elastic disc seating on the outer end of said neck with its peripheral portion clamped between the outer end of said outer wall and said circumferential portion of said housing.

3. In combination, an automobile radiator, a filler neck structure therefor comprising an inner wall defining a filler neck and an outer wall defining with said neck an exterior venting passage, a cap structure for closing the outer end of said neck structure comprising a housing having a circumferential portion overlying said outer wall, means for removably securing said cap structure on said outer wall, and a yielding disc extending across the lower end of said housing and beneath the circumferential portion thereof yieldingly urged toward said neck, the peripheral portion of said disc being clamped between said circumfential portion of said cap structure housing and the outer end of said outer wall and the portion of said disc inward beyond said circumferential portion of said cap structure housing normally yieldingly seating on the outer end of said neck, when said cap is in substantially fully closed position.

FRANK P. ILLSLEY.